No. 727,763. PATENTED MAY 12, 1903.
E. B. ELLICOTT.
ELECTRICAL SWITCHBOARD.
APPLICATION FILED APR. 26, 1901.
NO MODEL.
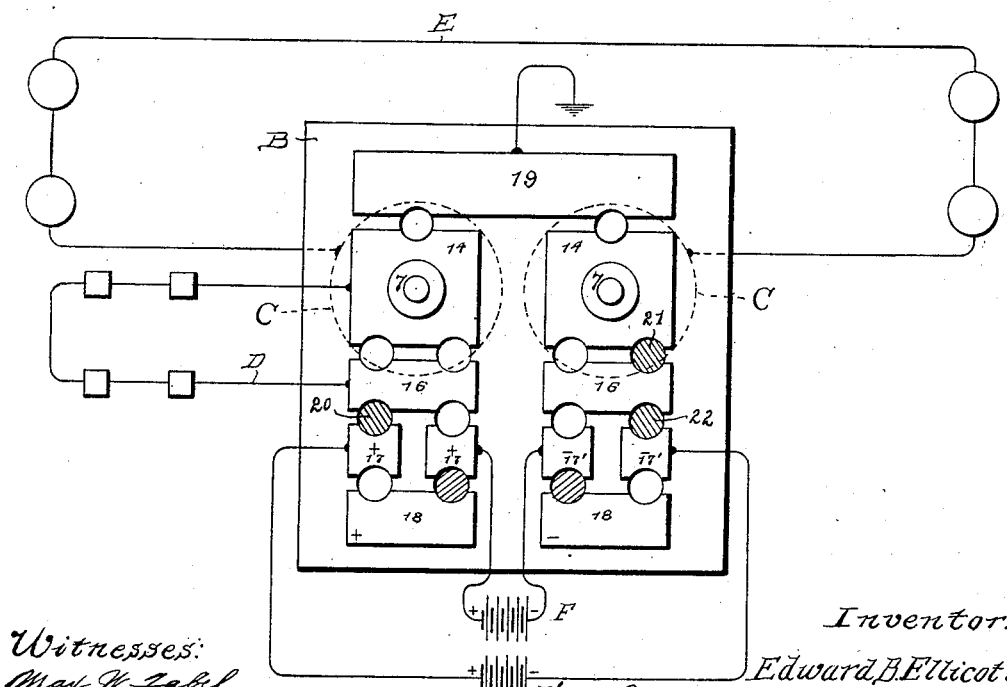
Witnesses:
Max W. Zabel.
Harvey L. Hanson.
Inventor:
Edward B. Ellicott,
By Charles A. Brown Cragg & Belfield
Attorneys.

No. 727,763. Patented May 12, 1903.

UNITED STATES PATENT OFFICE.

EDWARD B. ELLICOTT, OF CHICAGO, ILLINOIS.

ELECTRICAL SWITCHBOARD.

SPECIFICATION forming part of Letters Patent No. 727,763, dated May 12, 1903.

Application filed April 26, 1901. Serial No. 57,613. (No model.)

*To all whom it may concern:*

Be it known that I, EDWARD B. ELLICOTT, a citizen of the United States, residing at Chicago, in the county of Cook and State of Illinois, have invented a certain new and useful Improvement in Electrical Switchboards, (Case No. 1,) of which the following is a full, clear, concise, and exact description, reference being had to the accompanying drawing, forming a part of this specification.

My invention contemplates the securing of certain novel and desired results in the manner of connecting a plurality of batteries with working and charging circuits.

In the accompanying drawing the figure is a view of certain circuits and batteries and a portion of a switchboard by which the same can be connected in accordance with my invention.

In the drawing enough of the board B is shown to illustrate my invention as applied to a working circuit consisting of an interior portion D and an exterior portion E, although it will be understood that the invention can be applied to any manner of circuit. This combined circuit is shown protected by two protective devices C C, (indicated in dotted lines,) one of which is on each side of the circuit. These protective devices are indicated as being constructed in accordance with the invention disclosed in my application, Serial No. 86,225, filed December 17, 1901, although it is understood that no protective device need be employed, and if one is employed any form may do as well as the form of my said application. Since I have shown such protective devices, which are understood to be mounted upon the board, the form of the latter is modified naturally by the necessities of the peculiar construction of such protective devices, and I desire to be understood that in describing the present invention in connection with such protective devices I do not intend to limit myself to the use of either those devices or equivalent ones.

The board B is provided with two metallic portions 14 14 for the two protective devices and also with metallic portions or contacts 16, 16, 17, 17, 17', 17', and 18 18. The circuit D is connected with one of the contacts 14 and the adjacent contact 16. Two batteries F F' are provided, so that one battery may be charged while the remaining battery is in operative association with the circuit to be protected, the battery F being connected with the two centrally-located contacts 17 17' and the battery F' being connected with the outside contacts 17 17'. An emergency-battery is thus always at hand. The board is also provided with a contact 19, which is arranged above the contacts 14 14 and is connected with the ground. When the circuit D is connected so as to be protected by the two devices shown in the drawing, plugs 20, 21, and 22 are inserted, the plug 20 between the contact 16 and the adjacent contact 17, the plug 21 between the other contact 14 and the adjacent contact 16, and the plug 22 between said contact 16 and the adjacent contact 17'. In this way the circuit is made from the circuit D, containing the instruments to be protected, to the contact 14, thence through one protective device, then through the circuit E to the other protective device, then through plug 21 to contact 16, plug 22 to contact 17', then through the battery F', and finally through contact 17, plug 20, to contact 16.

In the arrangement shown in the drawing while the circuit F' is connected with the work-circuit, as described, the circuit F is connected with a charging-circuit by the plugs shown, inserted between the contacts 17 and 18 and 17' and 18, respectively.

If it is desired to charge battery F', the other battery F is employed by making proper connections with the plugs. If it is desired to test for an open circuit, the circuit D is shunted by making plug-contact between contacts 14 and 16. If it is desired to test for or shunt to ground, connection is made between contacts 14 and 19. It will thus be seen that the protective devices can be connected so as to have the operation of either of them open the circuit, and at the same time provision is made for various different connections of the circuit, as set forth. It will be readily understood, of course, that these connections can be employed for any form of protective device as well as for that herein set forth.

While I have herein shown and particularly described the preferred embodiment of my invention, I do not wish to limit myself to the precise construction and arrangement as herein shown and particularly described; but,

Having thus described my invention, I claim as new and desire to secure by Letters Patent—

1. In an electrical switchboard, the combination of a plurality of battery-terminal blocks 17, each connected with one electrode of a separate battery, a plurality of terminal blocks 17', each connected with the other electrode of the respective battery, a plurality of contact-blocks 16 connected with electrical circuits, and contact-plugs adapted for insertion between said terminal blocks and said contact-blocks, whereby either one or more sets at a time, or all batteries at once, may be connected with said circuits, substantially as described.

2. In an electrical switchboard, the combination of a plurality of battery-terminal blocks 17, each connected with one electrode of a separate battery, a plurality of terminal blocks 17', each connected with the other electrode of the respective battery, a plurality of contact-blocks 16 connected with electrical circuits, contact-blocks 18 connected with a suitable charging source, and contact-plugs adapted for insertion between said battery-terminal blocks and said other contact-blocks whereby all sets of batteries at once may be connected with the electrical circuits or one or more sets at a time connected therewith, and the remaining batteries meanwhile recharged by being connected with contacts 18, substantially as described.

3. In an electrical switchboard, the combination of a plurality of battery-terminal blocks 17, each connected with one electrode of a separate battery, a plurality of terminal blocks 17', each connected with the other electrode of the respective battery, a plurality of contact-blocks 16 connected with electrical circuits, contact-blocks 18 connected with a suitable charging source, a plurality of contact-blocks 14 which may be connected with suitable protective devices, a contact-block connected to ground, and contact-plugs adapted for insertion between to electrically connect any of said blocks, substantially as described.

In witness whereof I hereunto subscribe my name this 19th day of April, A. D. 1901.

EDWARD B. ELLICOTT.

Witnesses:
GEORGE L. CRAGG,
MAX W. ZABEL.